United States Patent
Melby (12) 
(10) Patent No.: US 8,285,631 B2
(45) Date of Patent: Oct. 9, 2012

(54) METHOD AND SYSTEM FOR STRUCTURING THE OWNERSHIP OF AN INVESTMENT

(76) Inventor: Garrett D. Melby, Wyndmoor, PA (US)

( * ) Notice: Subject to any disclaimer, the term of this patent is extended or adjusted under 35 U.S.C. 154(b) by 445 days.

(21) Appl. No.: 12/478,986

(22) Filed: Jun. 5, 2009

(65) Prior Publication Data

US 2010/0010927 A1 Jan. 14, 2010

Related U.S. Application Data (60) Provisional application No. 61/059,147, filed on Jun. 5, 2008.

(51) Int. Cl.
*G06Q 40/00* (2012.01)

(52) U.S. Cl. ......... 705/37; 235/376; 705/14.17; 705/30; 705/35; 705/36 R; 705/38; 705/39; 705/500

(58) Field of Classification Search .................. None
See application file for complete search history.

(56) References Cited

U.S. PATENT DOCUMENTS

| | | | |
|---|---|---|---|
| 5,621,640 A * | 4/1997 | Burke | 705/14.17 |
| 6,581,041 B1 * | 6/2003 | Canney | 705/36 R |
| 7,448,534 B2 * | 11/2008 | Stremler et al. | 235/376 |
| 2004/0034585 A1 * | 2/2004 | Saunders | 705/35 |
| 2004/0249735 A1 * | 12/2004 | Cassani et al. | 705/35 |
| 2005/0015335 A1 * | 1/2005 | Howard | 705/39 |
| 2006/0059070 A1 * | 3/2006 | Petruck | 705/35 |
| 2007/0203825 A1 * | 8/2007 | Hanifin et al. | 705/38 |
| 2008/0288374 A1 * | 11/2008 | Stremler et al. | 705/30 |
| 2010/0332421 A1 * | 12/2010 | Henderson | 705/500 |

FOREIGN PATENT DOCUMENTS

WO WO 99/49385 * 3/1999

OTHER PUBLICATIONS

Picard, Dianne. "Raymond James Unveils Charitable Program." Financial Planning, vol. 29, No. 6. Jun. 1999.*

* cited by examiner

*Primary Examiner* — Robert Niquette
(74) *Attorney, Agent, or Firm* — Pepper Hamilton LLP (57) ABSTRACT

A method of structuring ownership of an invention including the steps of receiving an investment commitment and a capital contribution from at least one investor, investing the capital contribution in a portfolio company, assigning a set of securities to the at least one investor based upon the capital contribution, the set of securities comprising a plurality of strips, and providing one or more of the plurality of strips to the at least one investor, wherein each of the plurality of strips is defined as a portion of the capital contribution and wherein at least one of the strips is dedicated for donation by the investor to at least one charity.

8 Claims, 4 Drawing Sheets

METHOD AND SYSTEM FOR STRUCTURING THE OWNERSHIP OF AN INVESTMENT

CROSS REFERENCE TO RELATED APPLICATION

This application claims the priority benefit of U.S. Provisional Application No. 61/059,147 filed Jun. 5, 2008.

NOT APPLICABLE

Background

The present disclosure relates to investment structuring, and more specifically to methods and systems for structuring the ownership interests of private equity investments.

In the private equity markets, there has been little innovation in investment structures since the adoption of the limited partnership fund nearly fifty years ago. By contrast, the development of a variety of sophisticated derivative structures in the public equity markets has allowed investors to isolate risks and improve returns. These various derivative structures have given rise to a hedge fund market with a total volume presently in excess of one trillion dollars.

In public equity markets, there is a growing demand among investors that their investments, or a portion of them, should support social objectives. This investment approach, termed Socially Responsible Investing (SRI), has become one of the fastest growing investment categories. Retail investment in SRI funds totaled $180 billion in 2005 and continues to grow at an annual rate of over 18%. In addition, $2.3 trillion of institutional investment is subject to SRI screening. Although there is an emerging market for "social venture" or "venture philanthropy" investment, to date, investment strategies and structures in this field have, either explicitly or implicitly, sacrificed potential returns in exchange for social objectives.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "toner" is a reference to one or more toners and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In one general respect, the embodiments disclose a method of structuring ownership of an invention. the method includes executing a series of instruction stored on at least one computer readable medium, wherein the instructions are configured to receive an investment commitment and a capital contribution from at least one investor, invest the capital contribution in a portfolio company, assign a set of securities to the at least one investor based upon the capital contribution, the set of securities comprising a plurality of strips, and provide one or more of the plurality of strips to the at least one investor, wherein each of the plurality of strips is defined as a portion of the capital contribution and wherein at least one of the strips is dedicated for donation by the investor to at least one charity.

In another general respect, the embodiments disclose a system for structuring ownership of an investment. The system includes a fund management computing device operably connected to an investor device and configured to receive an investment commitment from the investor computing device; and a special purpose vehicle (SPV) computing device. The SPV computing device is configured to receive a capital contribution at least one investor, invest the capital contribution in a portfolio company, assign a set of securities to the at least one investor based upon the capital contribution, the set of securities comprising a plurality of strips, and provide one or more of the plurality of strips to the at least one investor, wherein each of the plurality of strips is defined as a portion of the capital contribution and wherein at least one of the strips is dedicated for donation by the investor to at least one charity.

In another general respect, the embodiments disclose a method of structuring ownership of an invention. The method includes executing a series of instruction stored on at least one computer readable medium, wherein the instructions are configured to receive an investment commitment from at least one investor, determine a special purpose vehicle (SPV) based upon the investment commitment, receive a capital contribution at the SPV from at least one investor, invest the capital contribution in a portfolio company, assign a set of securities to the at least one investor based upon the capital contribution, the set of securities comprising a plurality of strips, and provide one or more of the plurality of strips to the at least one investor, wherein each of the plurality of strips is defined as a portion of the capital contribution and wherein at least one of the strips is dedicated for donation by the investor to at least one charity.

BRIEF DESCRIPTION OF THE DRAWINGS

Aspects, features, benefits and advantages of the present invention will be apparent with regard to the following description and accompanying drawings, of which.

DETAILED DESCRIPTION

An exemplary method for structuring the ownership of a private equity investment may employ a Private Equity Philanthropy Strip (PEPS). As a financial instrument, a PEPS is a derivative structure for use in the private equity and other markets. As a system for Socially Responsible Investing (SRI), the PEPS structure is designed to provide enhanced financial returns while also generating significant social impact through charitable contributions. The PEPS structure also provides a methodology for deploying those charitable contributions to develop commercially sustainable social innovation. While the present invention is exemplified herein with respect to SRI, it should be understood that the PEPS structure is not limited to the context of philanthropy or SRI, and that the full scope of the invention as described and claimed herein extends to methods and systems for structuring the ownership of an investment outside of the context of SRI.

One benefit of the PEPS system that may be most readily compared to the performance of the conventional private equity structure is the improvement in potential net returns to investors. The examples cited herein demonstrate that the PEPS structure may increase returns for the average investor by as much as 13% to 33% (depending on portfolio performance) above the returns generated by a conventional venture capital fund. Investors who are able to utilize additional capital gains tax benefits may be able to increase those exemplary improvements to as much as 38% to 63%. Further, the PEPS structure may also provide additional financial benefits related to loss protection, risk reduction, and improved diversification.

The PEPS system may also generate considerable social benefits. Compared to conventional philanthropy, a charitable organization participating in the PEPS system may be able to receive significantly increased funding with virtually no development costs. By way of example, a charitable organization that is associated with a $10 million fund may receive, on average, $9.3 million over the life of the fund. If, however, investors in that fund pursued a reinvestment strategy enabled by the PEPS system, the amount expected to be received by the charitable organization may increase to as much as $18 million. By aligning itself with a fund that participates in the PEPS system, the charitable organization should also increase the potential social impact of the activities it supports with these funds.

Figure 1:
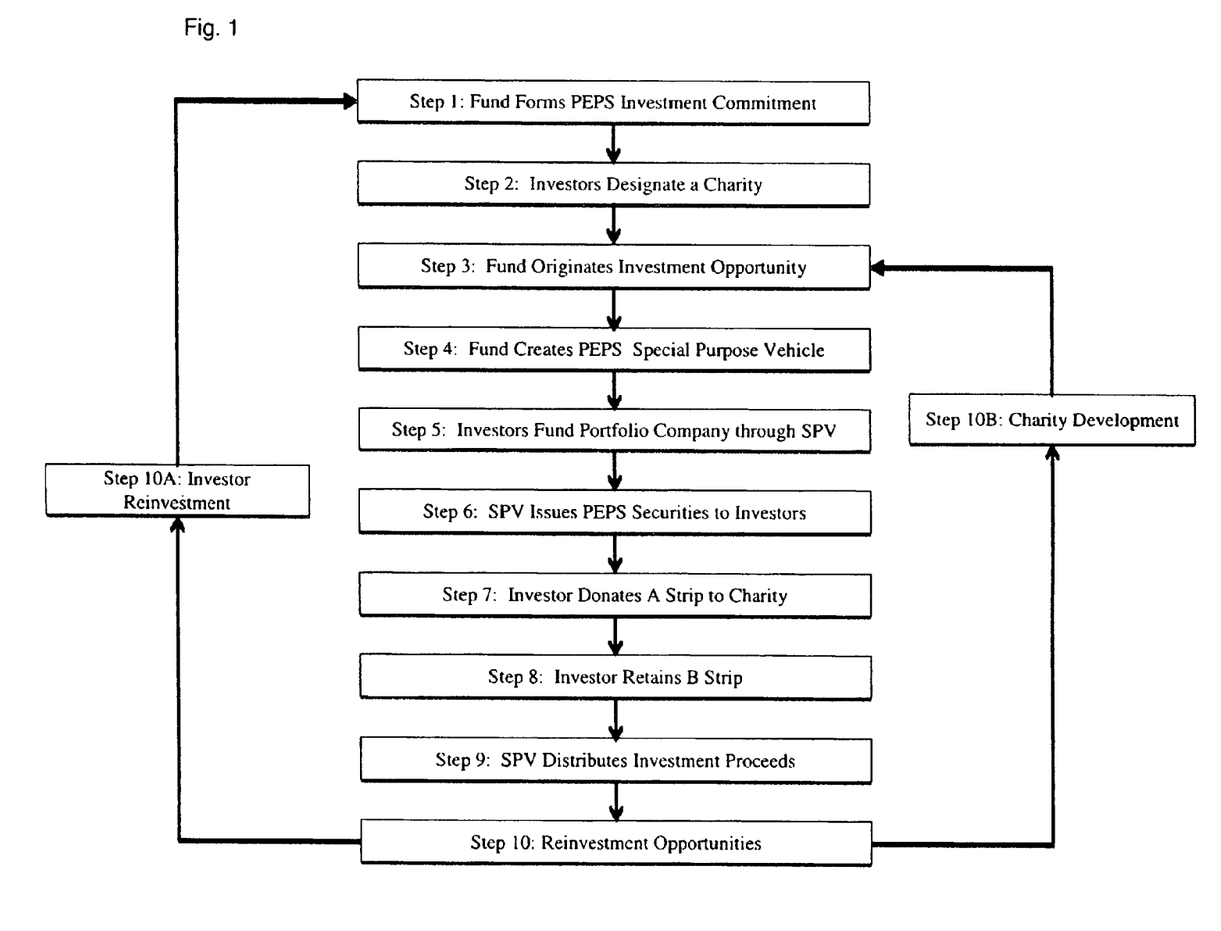
FIG. 1 illustrates an exemplary flow chart of the sequential steps for structuring and administering an exemplary Private Equity Philanthropy Strip (PEPS) system.

Referring now to the drawings, and more particularly to FIG. 1, an exemplary method is shown in which a fund enters into a PEPS investment commitment with one or more investors to implement the PEPS structure in STEP 1. The fund may be any business entity or sole proprietorship that develops and/or manages PEPS investment opportunities for investors. In one embodiment, a new fund may be established to implement the PEPS system. In another embodiment, a conventional private equity fund may adapt its existing structure to allow for the implementation of the PEPS system by any or all of its limited partners.

It should be noted, however, that while the exemplary method shown in FIG. 1 employs a fund structure, and fund structures are common structures used in early stage investing, the PEPS structure may be implemented by one or more investors with or without the involvement of a fund. In some embodiments, the PEPS system might be employed by an individual investor or a group of individual investors. In other embodiments, the PEPS system might be employed by a company in connection with a variety of business transactions including merger and acquisition activities as well as strategic investments.

An investor may be any natural person or legal entity capable of making an investment in and benefiting from the PEPS structure. Investors include those whose gains may be subject to federal or state tax, as well as tax-exempt institutions such as, for example, pension funds, university endowments and private foundations.

The PEPS system may be utilized effectively to provide all types of investors with opportunities to participate in a wide variety of investments including some otherwise not readily available to them such as, for example, the funding of venture-backed technology companies. And while the PEPS structure can be of benefit to investors of all types, regardless of their tax status, additional benefits may be realized by non-tax-exempt investors.

Similar to a conventional limited partnership agreement of a private equity fund, the relationship among investors, the fund, and portfolio companies within the context of the PEPS system will be defined by one or more investment agreements or commitments. Terms such as, for example, the amount and duration of the capital commitment, investment criteria, governance covenants, and fund compensation are expected to be similar to those negotiated among participants in conventional early stage private equity partnership agreements. In the examples described herein, for both the PEPS and conventional structures, a $10,000,000 commitment to a ten-year fund is supported by a 2% annual management fee and a 20% profit participation or carried interest.

Referring to STEP 2 of FIG. 1, the fund may establish a new charitable organization or associate with one or more existing charitable organizations to participate in the PEPS structure. A charitable organization may be a public charity, foundation, non-profit organization, or other entity to which, under U.S. federal or state laws, donations entitle the donor to receive a tax deduction or other benefit. In one embodiment, the charitable organization may be addressing an area of social concern (e.g. diseases, environmental sustainability, medical research, education, etc.) that is aligned with the investment sector targeted by the fund. Alternatively, investors may choose to make contributions to several unrelated charitable organizations, while also realizing the financial benefits of the PEPS system. In one embodiment, investors or the fund may appoint a single non-profit organization to receive PEPS donations from investors and manage those securities until a return has been realized to facilitate the administration of the PEPS structure. This non-profit organization would then distribute the proceeds to the charitable organization designated by the investors or the fund as the intended beneficiary.

Referring to STEP 3 of FIG. 1, once an investment commitment is in place, the fund will develop and pursue investment opportunities. The PEPS system can be implemented Referring to STEP 4 of FIG. 1, the fund may organize a special purpose vehicle (SPV) to act as a conduit for each investment. The SPV can be any suitable entity including a limited liability company or other tax-neutral entity. The function of the SPV is to provide a buffer between the investment, such as a portfolio company, and the unconventional aspects of the PEPS system. As a result, the portfolio company and its existing investors should not experience any difference in the investment terms or corporate governance process as compared to having obtained an investment from a conventional private equity fund.

In one embodiment, the fund will control the SPV and the exercise of its investment rights in the portfolio company. The use of the SPV as an intermediary between the portfolio company and the investors will enable the fund to coordinate the actions of all holders of PEPS securities, so that the participants may rely on unified professional management of the investment. The implementation of an SPV intermediary, however, is not essential to the PEPS structure, as most of the financial and operational benefits may be obtained as the result of direct investment between the investors and the portfolio company, or an investment made through the fund itself, with an assignment of certain rights to the investors.

Referring to STEP 5 of FIG. 1, the fund will negotiate an investment in the portfolio company on behalf of the investors. The examples cited below assume that $1,000,000 is invested in each portfolio company.

The pricing, financial terms and covenants pertaining to the investment are expected to be similar to those obtained from conventional private equity investors. It is an objective of the PEPS system that, from the perspective of the portfolio company, the PEPS investment should be competitive with, and able to be syndicated with, conventional sources of private equity.

According to an exemplary embodiment, investors will fund their investment commitment at the closing of an investment. Thereafter, funds will be provided to the SPV, and the SPV will, in turn, fund the portfolio company. The portfolio company will then issue securities to the SPV in exchange for its investment. These securities will typically be in the form of preferred equity, as is the conventional private equity practice, although any suitable form of securities may be negotiated, including convertible debt or common stock.

To enable the fundamental innovation of the PEPS system, the securities issued by the SPV will differ from a conventional private equity interest. Referring to STEP 6 of FIG. 1, the SPV will divide what would typically be a unified, preferred equity interest in the portfolio company into two or more discrete interests. These discrete interests are referred to as Private Equity Philanthropy Strips or "PEPS."

First, the SPV will issue to each investor an interest referred to as an "A Strip." The A Strip entitles the holder to a preferred or senior right to the return of invested capital together with a premium representing an agreed upon yield. The examples cited herein assume that the A Strip is entitled to a yield of 8% per annum.

While the A Strip may be structured as preferred equity, alternative structures for the A Strip may also be implemented and include, for example, a debt obligation. The yield on the A Strip may also be varied to suit the objectives of the participants. In one embodiment, the holders of the A Strip would be entitled only to a return of capital plus the stated yield, and that the all returns in excess of the amount needed to satisfy the A Strip would go to holders of the B Strip. If the participants wish to adjust the distribution of benefits between the investors and the charitable organization under the PEPS system, they can agree to increase the preference or rate of interest earned by the A Strip, or negotiate a more dynamic relationship in the distribution of proceeds. In this embodiment, for example, the holders of the A Strip would be entitled first to a return of capital plus the stated yield and further, after the holders of the B Strip have achieved a stated return, would participate in some fashion with the holders of the B Strip in excess profits.

Second, the SPV will also issue to each investor an interest referred to as the "B Strip." The B Strip entitles the holder to a subordinated or common interest in all proceeds above and beyond those required to satisfy the A Strip. The B Strip may be structured as convertible debt, as a profits interest, or in any other suitable form of subordinated, participating financial interest. The level at which the B Strip's participation commences, if at all, will depend upon the yield allowed to the A Strip.

An essential feature of the A Strip is that it represents a return of capital. In these embodiments, it should be understood that the A Strip is the interest with a lower risk relative to the B Strip, as the A Strip must be paid off prior to any participation by the B Strip. An essential feature of the B Strip is that it represents an opportunity to participate in any above-market or "windfall" returns on the investment in each Portfolio Company. The B Strip should also be understood as the high-risk interest relative to the A Strip, as its right to participate in proceeds of the investment is subordinate to the repayment obligations of the A Strip.

In one embodiment, the SPV may also issue a third interest referred to as the "C Strip." In one embodiment, the C Strip is issued to the fund in order to provide it with special governance rights, such as the unified exercise of rights among holders of all securities, and a means to provide compensation to the fund. In another embodiment, the same result in governance may be achieved through voting agreements among the security holders or the retention of management rights at the SPV level. Performance-based compensation for the fund may also be addressed through an allocation of B Strips between the investors and the fund that reflects an agreed-upon level of profit sharing by the fund.

Referring to STEP 7 of FIG. 1, upon the closing of the investment, the investor will donate the A Strip to the charitable organization. If the investor is subject to taxation, this donation may entitle the investor to claim deductions from federal and/or state taxes. The examples cited herein assume a federal marginal tax rate of 35%. If a state tax is also assumed to apply, a blended federal and state marginal rate of 39% is assumed. Alternatively, the investor may sell the A Strip to a third party. As a preferred claim in the future to the return of invested capital and a premium, it may be sold by the investor for its present discounted value.

An enhanced financial benefit may be obtained if the investor uses the PEPS structure to fund the investment with appreciated securities or other assets that would otherwise have been subject to federal capital gains tax upon liquidation. In one scenario, the cost of capital reduction provided by the PEPS system to an investor with a zero-basis asset would increase to 49%, from a base-case assumption of 35%.

One mechanism for achieving this enhanced benefit would be for the investor, prior to funding, to assign to the charitable organization the investor's rights and obligations under the investment commitment relating to the A Strips. When an investment is to be funded, that obligation would be satisfied by a contribution of the appreciated assets from the investor to the charitable organization. The charitable organization would then liquidate these assets in order to fund the investment.

As an alternative mechanism to obtain the enhanced benefit, the A Strip would be issued to an investor on a partially-paid basis, prior to funding. In connection with the donation of the A Strip, the charitable organization would assume the obligation to fund the investment. The charitable organization would, as a condition of accepting the gift of the A Strip, obtain a guarantee of the investment obligation from the investor, which would be satisfied with a contribution of appreciated assets.

Although certain tax benefits may be a by-product of the implementation of the PEPS system in certain embodiments, the PEPS system does not rely on any tax innovation or tax avoidance strategy. Rather, certain embodiments of the PEPS system utilize the well-established deductibility of charitable contributions to exchange the low risk/low return portion of the investor's investment, the A Strip, for an accelerated recovery of a portion of the invested capital. In other embodiments, the exchange of the low risk/low return portion of the investor's investment for an accelerated recovery of invested capital is accomplished through a sale of the A Strip. This exchange, accomplished by whatever suitable means, results in a basic restructuring of the investment with a shift in the timing of cash flows. Where the amount of the tax benefit or the present discounted value is about 35% to about 49% of the face value of the A Strip, the timing of this benefit or a sale can reduce the present-value cost of holding the B Strip by about 62% to about 87%.

For an investor seeking the historically high returns offered by conventional early stage private equity, which has had an annualized return of about 20% over the past twenty years, the A Strip with its yield of 8% is not an attractive asset. The "cost of capital" committed to the A Strip increases with the duration of the investment, which can be 3-7 years or more for early stage companies. The PEPS system provides that the investor, by donating the A Strip, will exchange an opportunity to earn a fixed return (8% as assumed in these examples) years out into the future for an immediate refund of a portion of his capital in the form of a tax deduction (35% to 49% as assumed in these examples). The refunded capital may be reinvested at the historical target rate during the same five-year period. An investor reinvesting the refunded capital at the historical target rate of about 20%, rather than holding the A Strip returning 8%, will end up earning an amount equal to the difference between these two rates (i.e., about 12%) for the life of the investment. Under these assumptions, the effective cost of the B Strip within an early stage investment strategy would be reduced to a real cost of about $0.38 to about $0.13 per $1.00 of private equity exposure acquired under the PEPS system.

Referring to STEP 8 of FIG. 1, the investor retains the B Strip. Each B Strip represents a separate interest in the potential for outperformance in an individual investment. A conventional private equity fund manages the risk of early stage investing by building a portfolio of 10-20 investments and dividing among the investors the average return of that portfolio. Under the PEPS system, these investments are disaggregated and each investment is subjected to the A Strip/B Strip split. In another embodiment, investors might choose to apply the PEPS structure to some, but not all, investments in a given portfolio to the PEPS system. One method for achieving this individual choice might be to apply the PEPS structure to all portfolio company investments, leaving the decision whether to make a contribution of the A Strip to the discretion of each investor.

Typically, the high average returns of early stage investing are driven by the few investments in the portfolio that perform extraordinarily well. In this context, the B Strip can be viewed as essentially an out-of-the-money option: an equity derivative that exposes the underlying portfolio volatility and offers a low-cost method of participating in the windfalls delivered by these extraordinary performers.

At the time each investment is made, the fund managers expect a positive return. Over time, however, these investments will fall into three categories: (i) losers which fail to return their capital, (ii) winners which return their capital with essentially a market return, and (iii) outperformers which exceed a market return. With respect to the winners, the PEPS structure will direct most of the proceeds to the charitable organization and the investor will suffer a loss. In the case of the losers, the investor will do a little better, as the tax benefit of the PEPS structure will restore some of the capital that would otherwise have been lost. In the case of the outperformers, the B Strip will participate at a very low cost and with no limit to the potential upside.

The financial innovation provided by the PEPS system is to reduce the real carrying cost of participating in an investment, such as a private equity portfolio, trading the low-yielding outcomes for accelerated cash flow in the form of a tax benefit early in the investment cycle, while retaining the upside exposure to the outperformers. Whether this structure is financially superior to a conventional private equity fund structure will depend on a variety of factors including, for example, the length of the investment cycle and the internal portfolio volatility; i.e., the extent to which the portfolio's total return is derived from a few outlying successes. Based on historical performance data, however, the PEPS structure should provide higher returns for investors in early stage venture capital, because both the time and volatility conditions tend to be met by successful portfolios.

In addition to dramatically higher returns for most successful portfolios, the PEPS structure provides downside protection in the event of poor portfolio performance. In the event that a portfolio proves to have been comprised predominantly of losers, the PEPS investor will have realized the tax benefits discussed above, and those funds will have been recovered in the first year of the investment cycle.

Referring to STEP 9 of FIG. 1, when the portfolio company achieves a sale, merger, public offering or other realization event for its investors, the SPV receives the proceeds. Depending on the nature of the transaction, the proceeds may include or be comprised entirely of cash and/or non-cash proceeds. In transactions involving non-cash proceeds, the SPV may liquidate such non-cash proceeds prior to distribution.

The SPV will first distribute proceeds to the charitable organization that holds the A Strip until the terms of the A Strip have been satisfied. As mentioned above, in one embodiment, an administrative non-profit might serve as the holder of the A Strips until they had been so liquidated. Once proceeds had been received, then this administrative non-profit would distribute such proceeds to the one or more non-profit beneficiaries designated by the investors. This method would simplify the use of the PEPS system to generate cash contributions for charities that were not interested in holding the A Strips. Any residual proceeds would then be distributed to the holders of the B Strips.

As indicated in FIG. 1, certain embodiments of the PEPS system include a re-investment of the benefits of the system in ways that enhance its financial benefits and its utility as a system to promote social innovation. The potential of these re-investment opportunities are not included in the quantifications of the financial benefits of the PEPS system cited herein.

Referring to Step 10A of FIG. 1, the investor can predict the amount of the tax benefit to be obtained from the donation of the A Strip and can reinvest that benefit in a PEPS system. If this process is repeated, the cumulative or "grossed-up" result is that the Investor can obtain a 90% increase in exposure to portfolio company opportunities for the same amount of capital that would be at risk under a conventional private equity structure. Rather than investing $1,000,000 in a conventional fund that will make twenty investments of $50,000 each, the PEPS investor can make up to thirty-eight similarly sized investments for the same capital risk.

By reducing the cost of exposure to the B Strip, the PEPS system allows an investor to significantly improve diversification without significantly diluting participation in the windfall outcomes that drive venture capital returns. The diversification substantially increases the probability that one or more such windfalls will be achieved and should increase the expected value of a PEPS investment. For the sake of simplicity, however, this benefit has not been reflected in calculations of the PEPS returns cited in the examples provided herein.

Referring to Step 10B of FIG. 1, the charitable organization applies some portion of the proceeds of the A Strip to support activities related to its social purpose.

Figure 2:
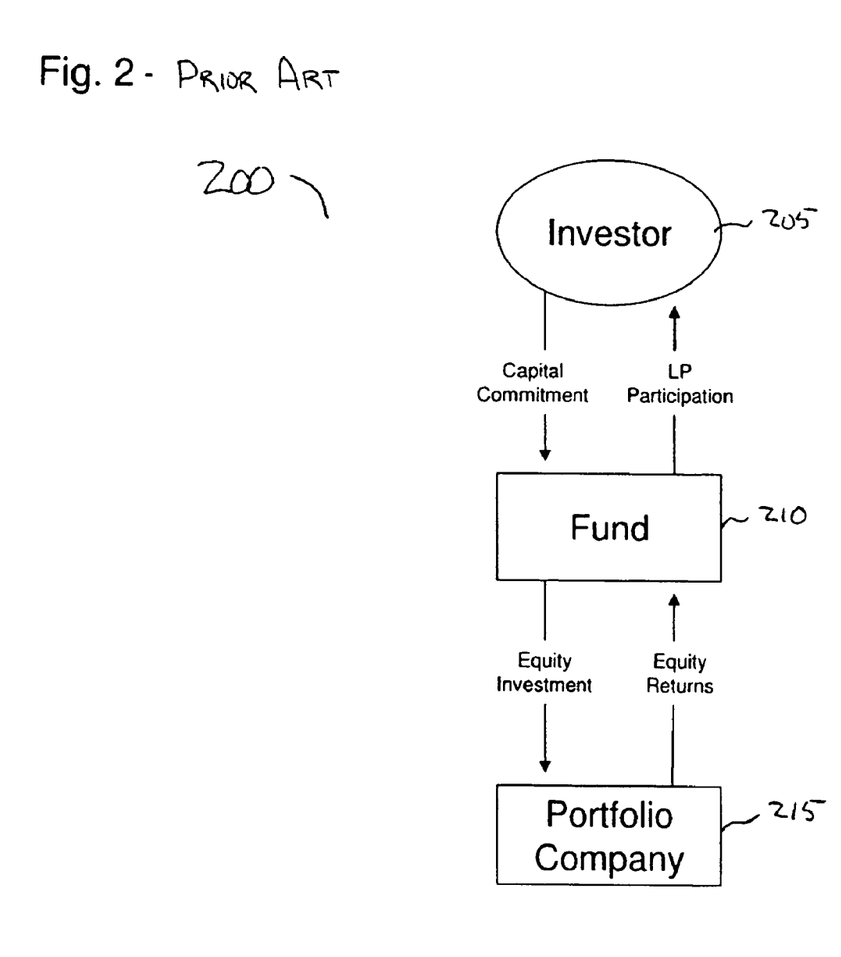
FIG. 2 illustrates an exemplary diagram of the relationships among participants in a conventional venture fund structure.

FIG. 2 illustrates a conventional relationship among participants in a conventional venture fund structure 200. One or more investors 205 provides a capital commitment to a selected fund 210. This capital investment is received by the fund 210, and directed as an equity investment toward a portfolio company 215 for re-investment in either a single or a diversified set of stocks, bonds or other investment opportunities. These opportunities may have varied risk, varied rates of returns, and potential guarantees on returns. After a period of time, the portfolio company 215 returns the original investment along with any accrued equity to the fund 210. The fund 210 may remove a portion of the accrued equity as its fee, and forwards the remaining equity to the investor 205. Unlike the PEPS structuring as discussed above in reference to FIG. 1, 100% of the investor 205 contributions go to the portfolio company 215, providing no tax or charitable benefits for the investor.

Figure 3:
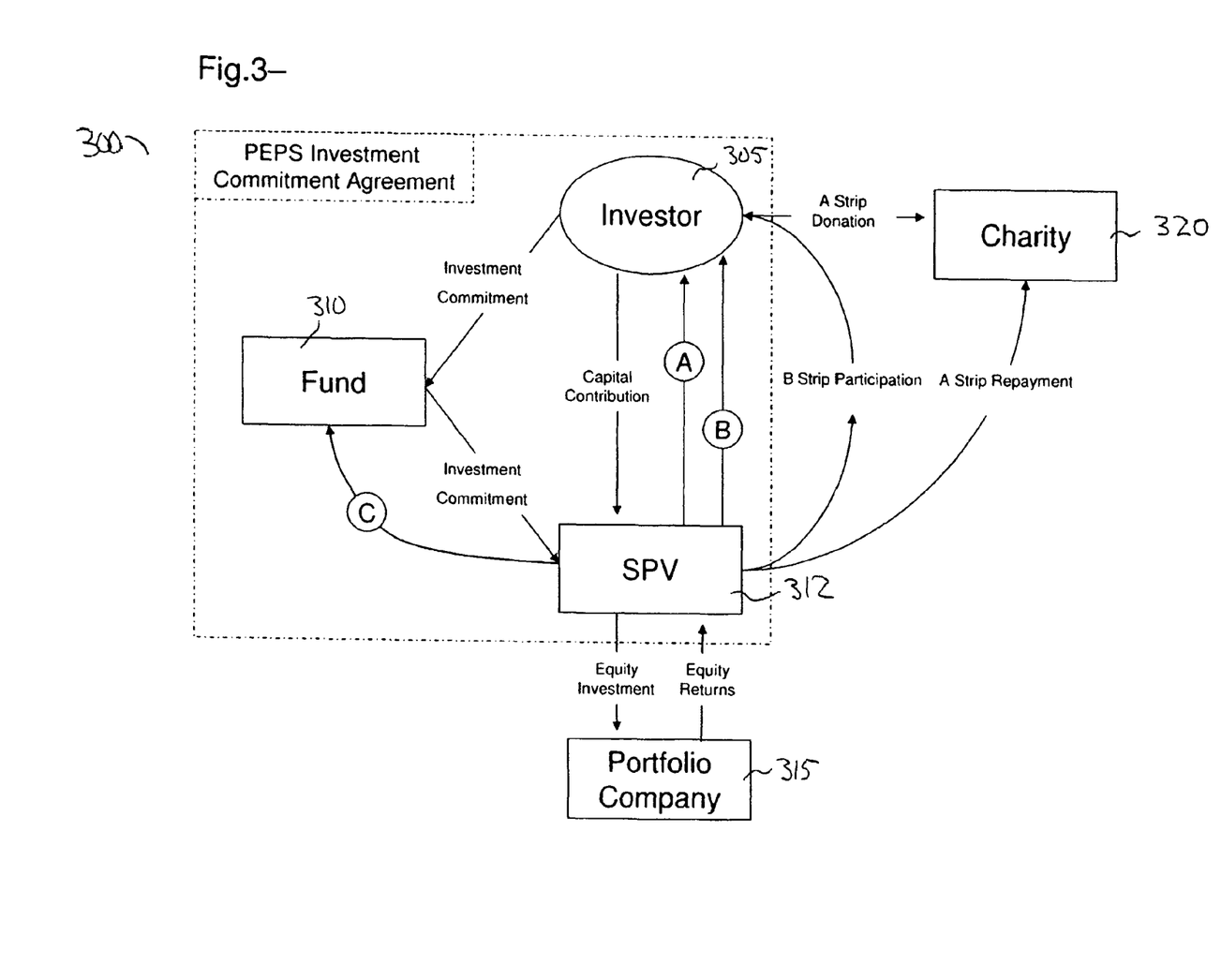
FIG. 3 illustrates an exemplary diagram of the relationships and transactions among the participants using an exemplary PEPS system.

FIG. 3 illustrates a relationship among participants in a PEPS venture fund structure 300. One or more investors 305 provide an investment commitment to a selected fund 310. This investment commitment is analyzed by the fund 310, and forwarded to a SPV 312. The investor 305 also forwards a capital contribution directly to the SPV 312. This capital investment is received by the SPV 312 and directed as an equity investment toward a portfolio company 315 for re-investment in either a single or a diversified set of stocks, bonds or other investment opportunities.

The SPV 312 may also assign a set of securities based upon the capital contribution. This set of securities may be divided into a plurality of strips as discussed above with reference to FIG. 1. In the example illustrated in FIG. 3, the securities are divided into three strips, the A Strip, the B Strip and the C Strip. Each strip may be a portion of the capital contribution. After a period of time, the portfolio company 315 may return the original investment along with any accrued equity to the SPV 312. The SPV 312 may remove a portion of the accrued equity as its fee, and forwards the remaining equity as determined by the various strips. In this example, both the A Strip and the B Strip are returned to the investor 305. The investor 305 may then donate the A Strip to charity 320. The SPV 312 may also pay the charity 320 an amount based upon the A Strip value for participating in the PEPS structure. The B Strip is paid to the investor 305 as well. However, the payment made to the investor 305 based upon the B Strip may be varied, and also may have great risk associated with it as the A Strip (and potential C Strip payment) may be guaranteed values. The SPV 312 may pay the C Strip to the fund 310 for participation in the PEPS structure, similar to the payment to the charity 320.

Figure 4:
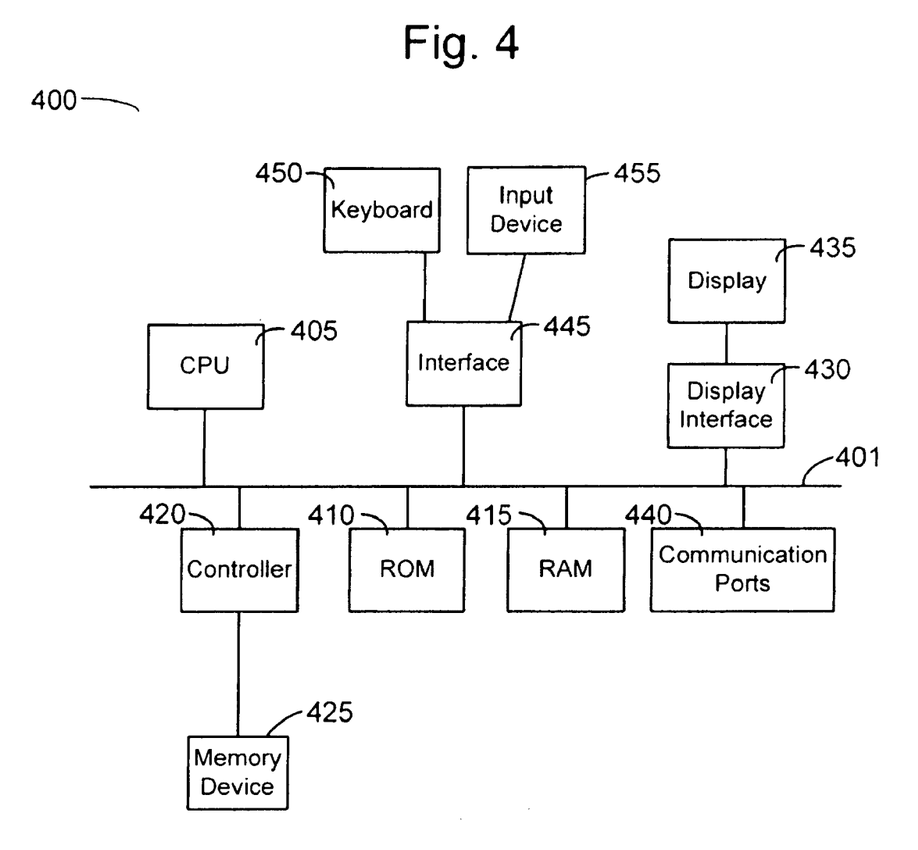
FIG. 4 illustrates an exemplary computer system.

FIG. 4 illustrates a block diagram of an exemplary computer system 400 that may be used to contain or implement program instructions for performing the methods discussed above. A bus 401 serves as the main information highway interconnecting the other illustrated components of the hardware. CPU 405 is the central processing unit of the system, performing calculations and logic operations required to execute a program. Read only memory (ROM) 410 and random access memory (RAM) 415 constitute exemplary memory devices.

A controller 420 interfaces with one or more optional memory devices 425 to the system bus 401. These memory devices 425 may include various computer readable mediums, for example, an external or internal DVD drive, a CD ROM drive, a hard drive, flash memory, a USB drive or the like. As indicated previously, these various drives and controllers are optional devices.

Program instructions may be stored in a computer readable medium such as in the ROM 410 and/or the RAM 415. These instructions may include various functions for performing the steps discussed above in reference to FIG. 1 such as fund allocation, capital division amongst various receiving parties, and various other process steps. Optionally, program instructions may be stored on a tangible computer readable medium such as a compact disk, a digital disk, flash memory, a memory card, a USB drive, an optical disc storage medium, such as Blu-ray™ disc, and/or other recording medium.

An optional display interface 430 may permit information from the bus 401 to be displayed on the display 435 in audio, visual, graphic or alphanumeric format. Communication with external devices may occur using various communication ports 440. An exemplary communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

An embedded system, such as a sub-system embedded within a dedicated network device (e.g., a data server having publicly or privately accessible mobile access terminals), may optionally be used to perform one, some or all of the methods and processes described herein. Likewise, a multi-processor system may optionally be used to perform one, some or all of the operations described herein.

It should also be noted that a group of computing devices may be in communication with each other to implement the methods and processes described herein. For example, an investor computing device may be in communication with a fund management computing device, which may in turn be in communication with an SPV computing device. The SPV computing device may be able to directly communicate with the investor computing device as well as the charity. Thus, a communications system is established in which operably connected computing devices can perform the various methods and processes described herein.

One embodiment of the PEPS system envisions a synergy of purpose between the charitable organization and fund. Just as government-funded research (e.g., DARPA or the NIH) frequently lays the groundwork for successful venture-backed start-ups, it is likely that the charitable organization's grant-making process will generate technologies with commercial investment potential. In such an embodiment, the fund would be in a position to invest in the commercialization and marketing of these technologies, increasing the prospect for the charitable organization's research grants to lead to sustainable social innovation. In addition, a fund participating in the PEPS system will enjoy lower operating costs, greater insight in the research pipeline, and a source of proprietary deal flow that would improve its likelihood of success and of outcomes beyond those financial benefits discussed previously.

In one such embodiment, the charitable organization would condition its grants with a requirement that, in the event a grant recipient were to seek commercial investment to advance a grant-based invention, the fund would have some right to participate in that investment opportunity. In such cases, the charitable organization may negotiate additional compensation or profit participation with respect to portfolio company investment opportunities that it originates for the fund. The charitable organization may also, as a result of its sector expertise and grant-making activities, be in a position to refer external opportunities to the fund and to generate additional resources by providing research and consulting expertise to the fund and its portfolio companies.

The PEPS system is an integrated capital cycle in which (i) the A Strips generate a charitable endowment, (ii) the endowment funds basic research projects, (iii) research projects generate commercialization opportunities, (iv) the fund has an advantaged position to invest in the most promising opportunities, (v) this advantaged selection supports superior portfolio company outcomes, (vi) these superior outcomes are efficiently captured by the B Strip, resulting in above-market returns, and (viii) these returns are reinvested into the system. In this manner, this system will enable significant amounts of funding to be directed to the development of technologies that can address a broad array of social challenges.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of structuring ownership of an invention comprising:
    executing a series of instruction stored on at least one nontransitory computer readable medium, the instructions configured to:
        receive an investment commitment and a capital contribution from at least one investor;
        invest the capital contribution in a portfolio company;
        assign a set of securities to the at least one investor based upon the capital contribution, the set of securities comprising a plurality of strips, wherein the plurality of strips is discrete interests in the portfolio company and comprise at least:
            a first strip entitling a holder of the first strip to a preferred or senior right to a return of invested capital together with a premium representing an agreed upon yield,
            a second strip entitling a holder of the second strip to subordinated or common interest above and beyond those required to satisfy the first strip, and
            a third strip entitling issued to a fund in the portfolio company, thereby providing the fund with special governance rights; and
        provide one or more of the plurality of strips to the at least one investor, wherein each of the plurality of strips is defined as a portion of the capital contribution and wherein at least one of the strips is dedicated for donation by the investor to at least one charity.

2. The method of claim 1, wherein the capital contribution is received by a special purpose vehicle (SPV) configured to invest the capital contribution and assign the set of securities.

3. The method of claim 2, wherein the investment commitment is received by a fund manager and forwarded to the SPV.

4. The method of claim 2, wherein each of the plurality of strips is determined by the SPV.

5. The method of claim 4, wherein the plurality of strips further includes a strip for payment to a fund manager.

6. A system for structuring ownership of an invention, the system comprising:
    a fund management computing device operably connected to an investor device and configured to receive an investment commitment from the investor computing device; and
    a special purpose vehicle (SPV) computing device configured to:
        receive a capital contribution at least one investor;
        invest the capital contribution in a portfolio company;
        assign a set of securities to the at least one investor based upon the capital contribution, the set of securities comprising a plurality of strips, wherein the plurality of strips is discrete interests in the portfolio company and comprise at least:
            a first strip entitling a holder of the first strip to a preferred or senior right to a return of invested capital together with a premium representing an agreed upon yield,
            a second strip entitling a holder of the second strip to subordinated or common interest above and beyond those required to satisfy the first strip, and
            a third strip entitling issued to a fund in the portfolio company, thereby providing the fund with special governance rights; and
        provide one or more of the plurality of strips to the at least one investor, wherein each of the plurality of strips is defined as a portion of the capital contribution and wherein at least one of the strips is dedicated for donation by the investor to at least one charity.

7. The system of claim 6, wherein the fund management computing device is further configured to establish communications with the SPV computing device based upon the investment commitment.

8. A method of structuring ownership of an invention comprising:
    executing a series of instruction stored on at least one nontransitory computer readable medium, the instructions configured to:
        receive an investment commitment from at least one investor;
        determine a special purpose vehicle (SPV) based upon the investment commitment;
        receive a capital contribution at the SPV from at least one investor;
        invest the capital contribution in a portfolio company;
        assign a set of securities to the at least one investor based upon the capital contribution, the set of securities comprising a plurality of strips, wherein the plurality of strips is discrete interests in the portfolio company and comprise at least:
            a first strip entitling a holder of the first strip to a preferred or senior right to a return of invested capital together with a premium representing an agreed upon yield,
            a second strip entitling a holder of the second strip to subordinated or common interest above and beyond those required to satisfy the first strip, and
            a third strip entitling issued to a fund in the portfolio company, thereby providing the fund with special governance rights; and
        provide one or more of the plurality of strips to the at least one investor, wherein each of the plurality of strips is defined as a portion of the capital contribution and wherein at least one of the strips is dedicated for donation by the investor to at least one charity.

* * * * *